US007756824B2

(12) United States Patent
Campbell et al.

(10) Patent No.: US 7,756,824 B2
(45) Date of Patent: Jul. 13, 2010

(54) SPREADSHEET COLLABORATION BETWEEN RICH AND BROWSER CLIENTS (75) Inventors: Johnny S. Campbell, Renton, WA (US); Joseph M. Chirilov, Redmond, WA (US); Michael H. Smith, Seattle, WA (US); Rishabh Tandon, Sammamish, WA (US); Robert G. Hawking, Seattle, WA (US); Robert L. Archer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/925,019

(22) Filed: Oct. 26, 2007

(65) Prior Publication Data

US 2009/0112937 A1 Apr. 30, 2009

(51) Int. Cl.
*G06F 17/00* (2006.01)

(52) U.S. Cl. .............................. 707/610; 707/999.203; 715/212

(58) Field of Classification Search .................. 707/610, 707/999.2, 999.201, 999.203; 715/205, 210, 715/212, 230, 751
See application file for complete search history.

(56) References Cited

U.S. PATENT DOCUMENTS

| 5,671,428 | A | 9/1997 | Muranaga et al. ........... 395/772 |
| 6,067,551 | A | 5/2000 | Brown et al. | |
| 6,558,431 | B1 | 5/2003 | Lynch et al. ................ 715/513 |
| 2002/0065848 | A1 | 5/2002 | Walker et al. ............... 707/511 |
| 2004/0085354 | A1 | 5/2004 | Massand ..................... 345/751 |
| 2006/0026502 | A1 | 2/2006 | Dutta ......................... 715/511 |
| 2007/0156774 | A1 | 7/2007 | Gomes ....................... 707/200 |

FOREIGN PATENT DOCUMENTS

WO    WO 2007/062949 A1    6/2007

OTHER PUBLICATIONS

Ming C. Hao, Concurrent Application Control in Collaborative Computing, 1994, Hewlett Packard, pp. 1-12.*
Moon Edit, © 2003-2005 by T. Dobrowolski, http://me.sphere.pl/indexen.htm, 2 pages.
Simultaneous Editing, Downloaded from the Internet Jul. 16, 2007, http://www.aboutus.org/SimultaneousEditing, 2 pages.

* cited by examiner

*Primary Examiner*—Fred I Ehichioya
(74) *Attorney, Agent, or Firm*—Woodcock Washburn LLP (57) ABSTRACT

Techniques for collaborating on a spreadsheet file by client computers in real time are disclosed herein. In particular, a revision manager module is preferably provided with a host machine which receives updates from the client computers, processes such updates, and then applies them to the spreadsheet file. Additionally, a technique is described for handling updates sent to the revision manager by clients simultaneously or near simultaneously. In this case, the revision manager determines whether the updates to the spreadsheet file are transformable or able to be merged. If so, the updates are combined into the spreadsheet file and applied thereto. If the updates are not transformable, the revision manager confirms that all clients have received all previous updates before applying the non-transformable update to the spreadsheet file.

17 Claims, 5 Drawing Sheets

SPREADSHEET COLLABORATION BETWEEN RICH AND BROWSER CLIENTS

BACKGROUND

Spreadsheet applications are commonly used programs that provide a convenient, simple and intuitive way to enter, organize, manage, view, store, and search for data. One drawback of conventional spreadsheet applications is that they typically do not allow multiple users to collaborate on a single spreadsheet file simultaneously. Rather, in conventional spreadsheets, when one user opens a file, that file becomes "locked" such that any other user who attempts to open the file can only do so in a read-only fashion, meaning any edits will not be saved to the original file.

There are many reasons that users may need to edit a file simultaneously. A Spreadsheet is often used as a data-entry application, and someone, for example, may set up a spreadsheet file to collect all of the financial results from all the different departments in a company. Files often have multiple authors, and those authors would like to edit the spreadsheet at will without having to wait for the other author to release a lock.

In addition to the desire to allow multiple users to collaborate on a single spreadsheet file, there is also a desire to allow multiple different types of clients to collaborate. Such clients may include both "rich" clients and "browser" clients. A rich client (which may also be referred to as a thick client or fat client) is a client that typically provides a greater selection of features and is typically capable of performing more data processing operations itself, and does not necessarily need to rely on a server. There are a number of circumstances in which, however, the rich client may choose to allow the server to perform various operations. A thin client is a client that typically provides a reduced selection of features and that typically relies on the resources of a host or server computer. The variance in features and other difference between rich and thin clients often make it difficult for users at such different clients to collaborate.

SUMMARY

Techniques for collaborating on a spreadsheet file by client computers in real time are disclosed herein. In particular, a revision manager module is preferably provided with a host machine which receives updates from the client computers, processes such updates, and then applies them to the spreadsheet file. Thereafter, the current version of the spreadsheet file is available to all clients by polling the revision manager. The revision manager sends those updates to each client not previously received so that all clients may have the spreadsheet file displayed with a current status during the collaboration.

Additionally, a technique is described for handling updates sent to the revision manager by clients simultaneously or near simultaneously. In this case, the revision manager determines whether the updates to the spreadsheet file are transformable or able to be merged. If so, the updates are combined into the spreadsheet file and applied thereto. If the updates are not transformable, the revision manager confirms that all clients have received all previous updates before applying the non-transformable update to the spreadsheet file. This provides the ability to include more functionality in a collaborative environment in later releases, as making all functionality transformable may be a very time consuming process.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
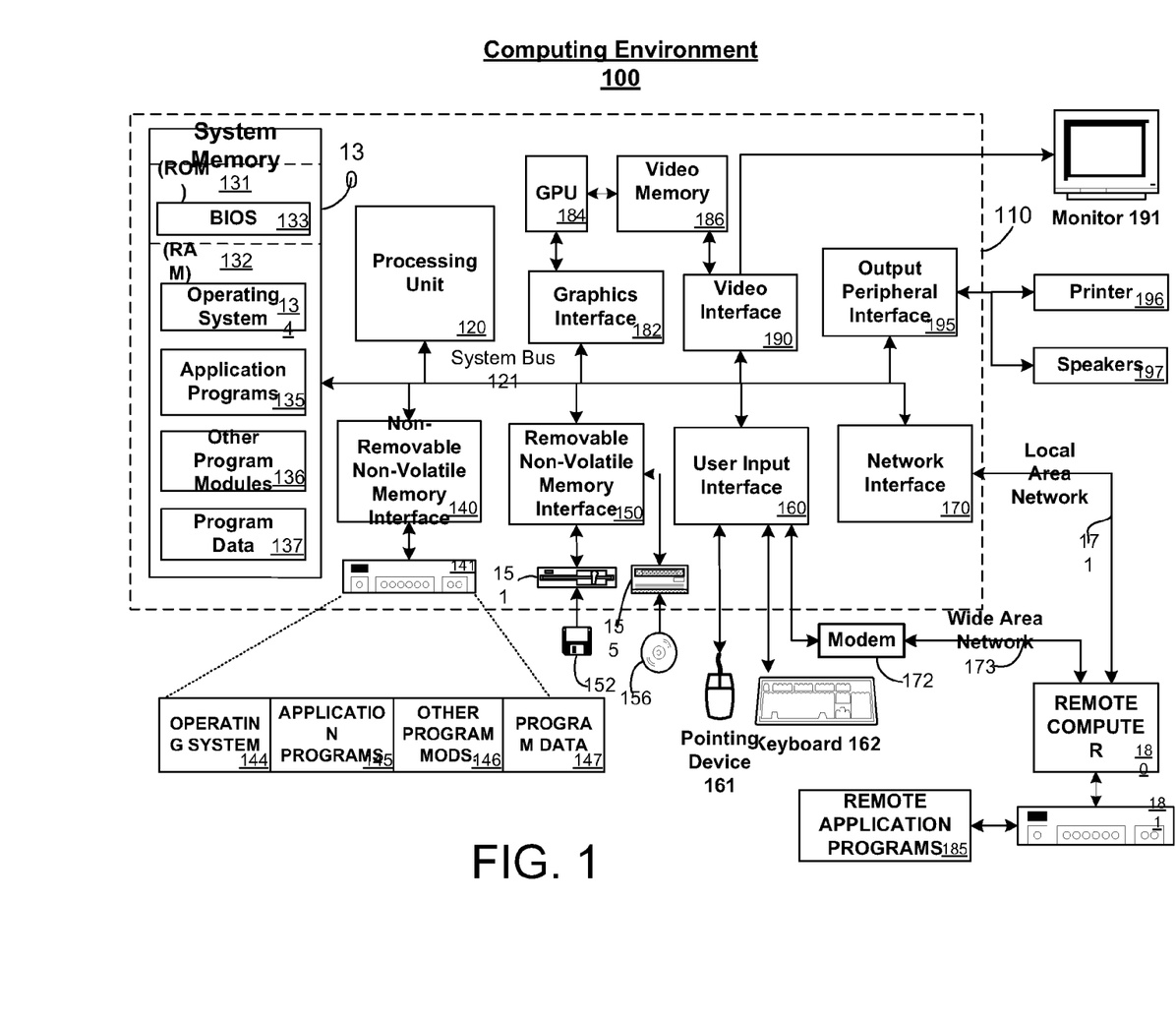
FIG. 1 is a block diagram of an exemplary computing device.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
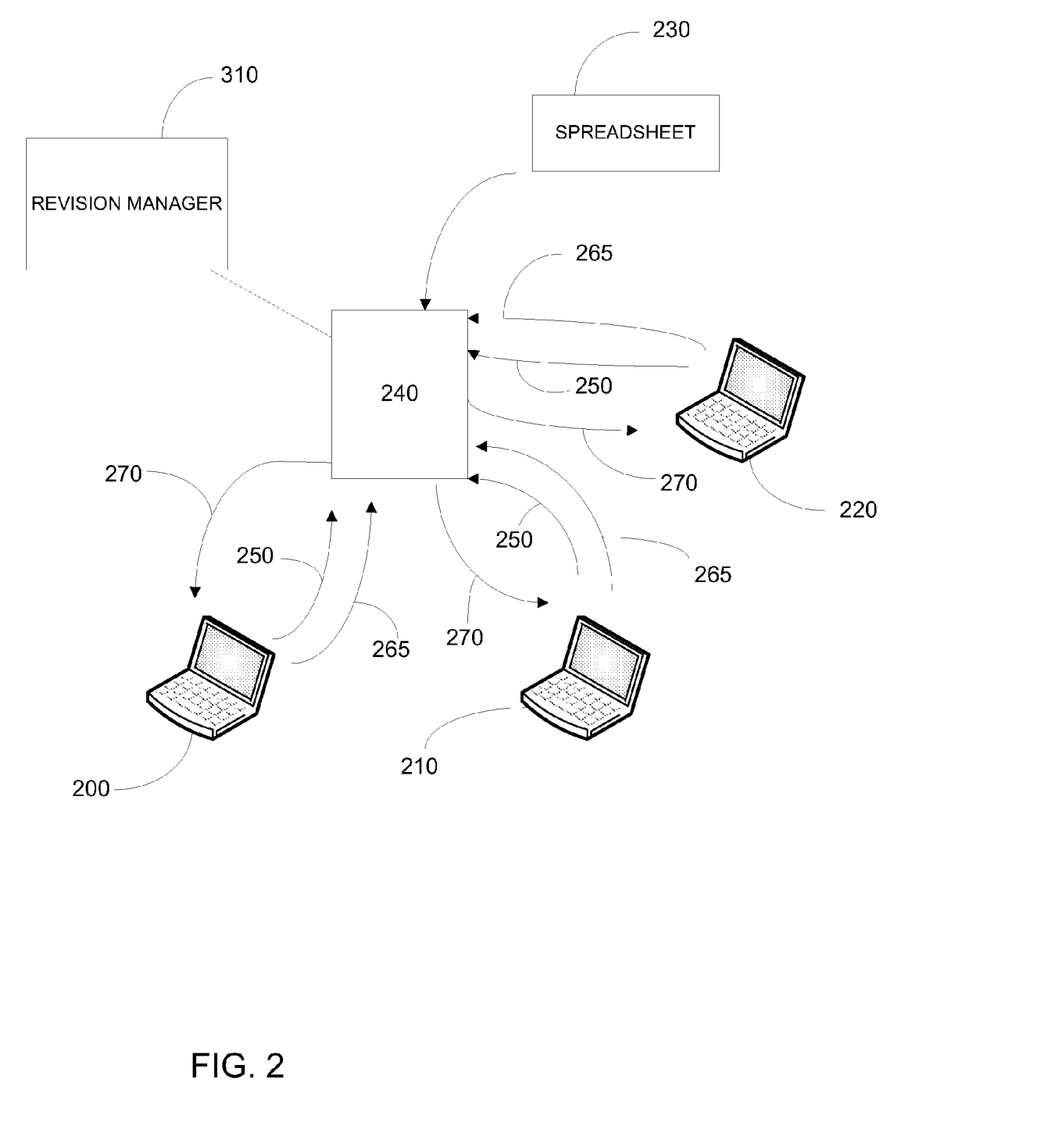
FIG. 2 is a system diagram depicting a plurality of client computers collaborating on a spreadsheet file, where a host machine includes a revision manager module for managing simultaneous updates to a spreadsheet file.

It will be appreciated from FIG. 2 that a plurality of computing systems 200, 210, and 220 like that described above, also known as clients, client computers or users, may desire to collaborate in real time on a common file, such as a spreadsheet file 230. Such clients include, for example, a "thick" client spreadsheet application or a thin client spreadsheet application. The spreadsheet applications on computing systems 200, 210, and 220 may employ a "collaborative" mode of editing where each user or client can see changes made by any other users or clients who are editing the file 230 at that time. As shown, this may be accomplished via a separate host machine 240, such as a server, which contains the version of spreadsheet file 230 that will be saved. It will be understood, however, that any of the client computers may be utilized as the host machine for the collaboration so long as it has the capability and the other client computers are properly networked therewith. This collaborative mode therefore differs from normal spreadsheet operation in which a client opens a spreadsheet file with exclusive access and all changes are pushed directly into the file with no other client editing the file while this is happening.

In the typical collaborative arrangement, each client computer will pass messages or data updates (as depicted by arrows 250) via computer-executable instructions to the host machine 240. It will be appreciated that each edit or change made by a client is packaged as a revision record by the client with details indicating what the change was, where it happened, who made the change, etc. Host machine 240 preferably includes a module 310 included therewith known herein as a revision manager which receives updates from the clients and processes such changes or incoming data. The revision record from the client is sent to the revision manager module 310, where it is received and processed. Upon completion of such processing and updating of spreadsheet file 230, and by request or polling of the host machine 240 by the individual client computers (represented by arrows 265), revision manager module 310 sends updates (as depicted by arrows 270) via computer-executable instructions to the client computer. In this way, the state of spreadsheet file 230 for the client computer making the request is updated with the current version of spreadsheet file 230 which includes updates from all client computers received during the collaboration. It will be understood that changes made to the spreadsheet file 230 by the host machine 240 will preferably be available to the client computers within milliseconds. It is also possible, for the host machine 240 to push the updates automatically to the client computers. The revision manager module 310 recognizes which client in the collaboration makes an update request, notes the last update that client has seen, and sends a revision record for all updates since that time. The client then applies that revision record and is now current with all updates made by all clients.

Generally, revision records may be processed by the revision manager module 310 in the order in which they are received. However, if two clients send revision records involving the same cells or objects in the spreadsheet file simultaneously or near simultaneously or the records overlap during processing, there is potential for conflict between the changes. Revision records will also be out of date if the second client was not up to date during record origination, or if the revision manager module 310 has received any other updates before receiving the second client's record, which must allow for time for the second client to submit the record (which is not necessarily immediately), transit time, and sending/receiving overhead. It will be understood that some revisions may be resolved and merged (known herein as "transformable" changes), whereas other revisions cannot be merged (known herein as "non-transformable" changes).

Figure 3:
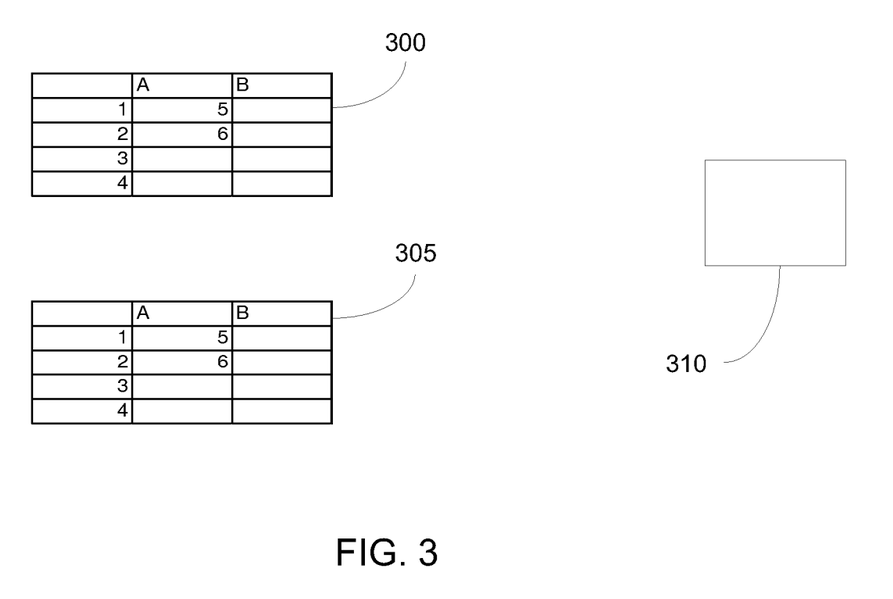
FIG. 3 is a diagrammatic view of a pair of partial views of a spreadsheet file from two of the client computers shown in FIG. 2 with the revision manager module.
Figure 4:
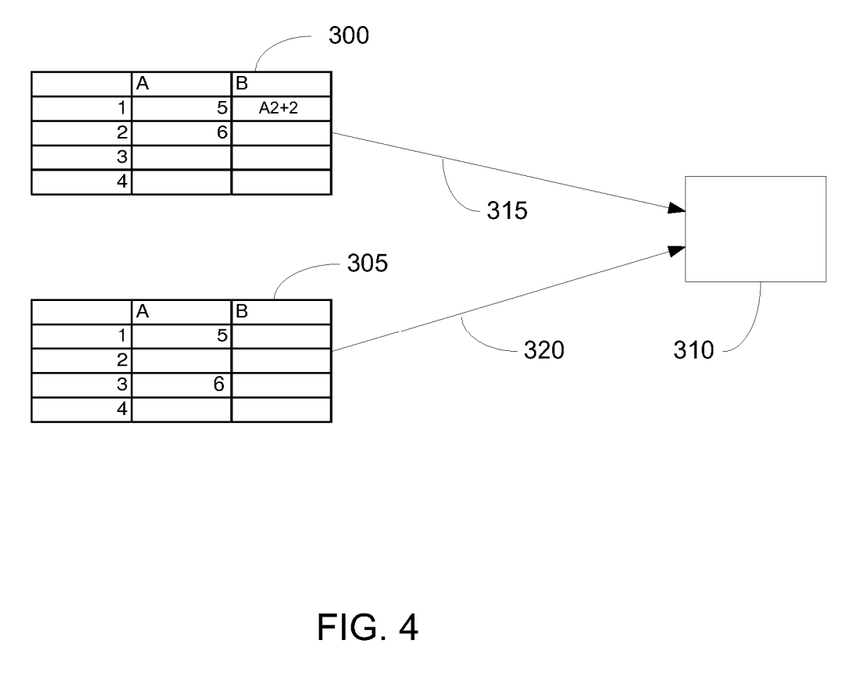
FIG. 4 is a diagrammatic view of the pair of partial views of the spreadsheet file for the client computers and the revision manager module depicted in FIG. 3, where simultaneous updates have been made.
Figure 5:
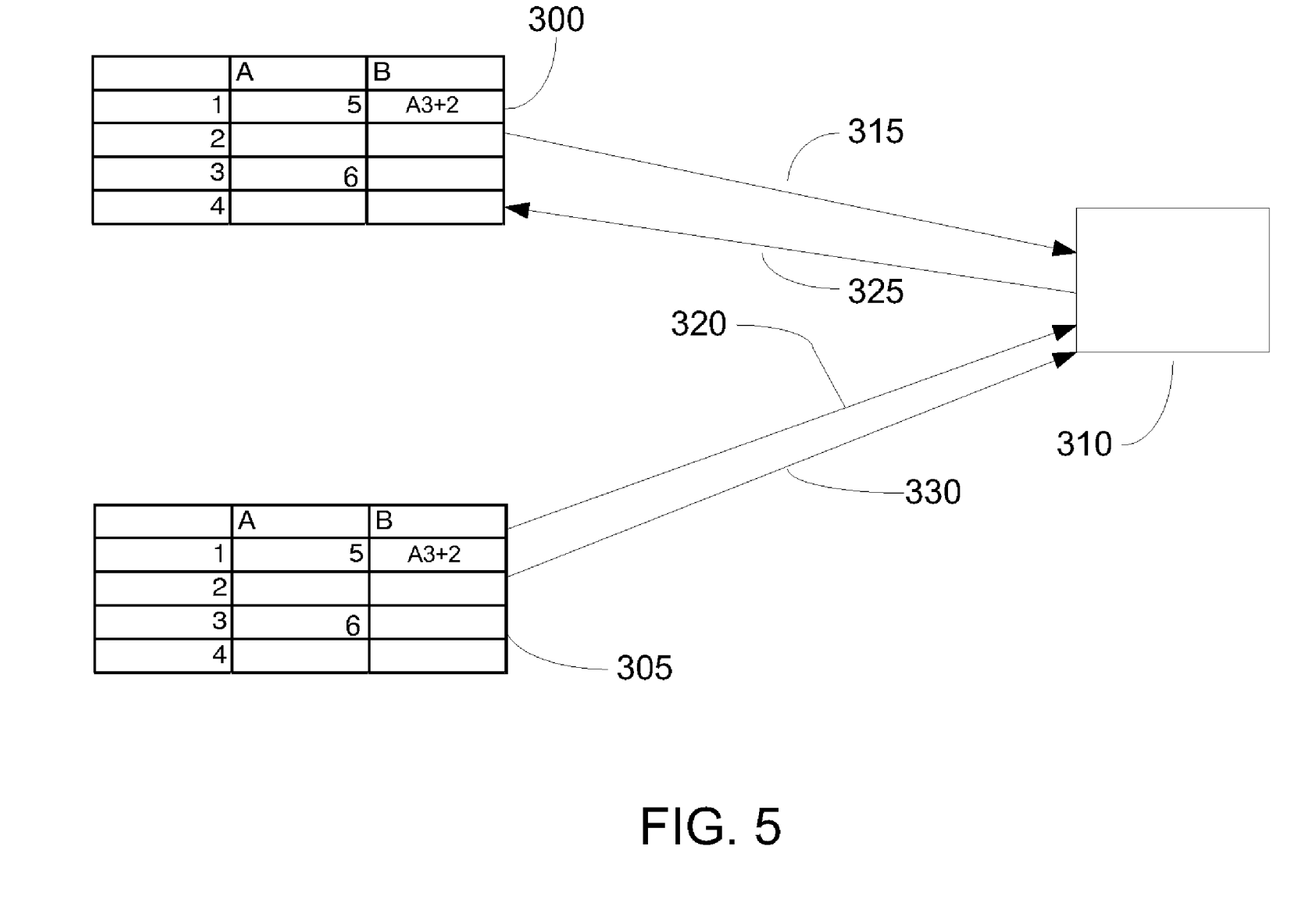
FIG. 5 is a diagrammatic view of the pair of partial views of the spreadsheet file for the client computers and the revision manager module depicted in FIGS. 3 and 4, where the revision manager module has merged the simultaneous updates of FIG. 4 in the spreadsheet file; and, FIG. 6 is a flow diagram of a process for merging simultaneous updates made to a spreadsheet file during a real time collaboration by a plurality of client computers.

An example of how two conflicting changes may be merged is depicted in FIGS. 3-5. As seen in FIG. 3, a partial view of a spreadsheet 300 for a first client and a partial view of a spreadsheet 305 for a second client is provided along with revision manager module 310. It will be noted that the views of spreadsheets 300 and 305 are identical at this point of the collaboration, with the values of 5 and 6 being located at cells A1 and A2, respectively. In FIG. 4, it will be seen that the first client has added a formula (i.e., A2+2) to cell B2 in spreadsheet 300 which involves the value within cell A2. At or near the same time, the second client has inserted a row above cell A2 in spreadsheet 305. Each of these changes are sent to revision manager module 310, as depicted by arrows 315 and 320, which must reconcile the conflict. In order to do so, revision manager module 310 processes both updates and makes the appropriate transformations in FIG. 5. Accordingly, revision manager module 310 sends a message 325 to the first client (user A) that it needs to insert a row between rows 1 and 2 in spreadsheet 300, with the first client handling the formula update in cell B1 (i.e., A3+2). Concurrently, revision manager module 310 sends a message 330 to the second client (user B) that it needs to add a new formula to cell B1 in spreadsheet 305, where the added formula has been adjusted to account for the inserted row. Thus, by making the appropriate transformations corresponding to updates 315 and 320, spreadsheets 300 and 305 reflect the intended changes from each client and are identical.

It will be appreciated that revision manager module 310 will not be able to merge every conflicting update sent thereto by the client computers. This stems, at least in part, to the exponential number of ramifications that an update provided by one client may have on another update provided by another client. Further, a detailed amount of knowledge of how to merge a change in one feature of the spreadsheet or an operation therein with a change in another feature or operation is required. This knowledge may not be available at run time.

Therefore, one approach is to distinguish between transformable revisions and non-transformable revisions and then categorize all possible edits for the spreadsheet application as being one of these two types. As noted herein, transformable records are those revision records that the revision manager module 310 knows how to merge together. All other revision records are considered non-transformable, which the revision manager module 310 recognizes as having no possible way of merging such revision record with other records waiting to be applied. In this instance, revision manager module 310 first makes sure that all clients have received all other previous updates so that all clients are currently at the same state. This may happen by having each client poll the revision manager for updates like it normally does, and the client receiving a message indicating that the revision manager is about to perform a non-transformable operation and to prevent users from making any further edits. In other words, to ensure that all clients have received all other previous updates, each client may be prevented from making new updates so that the revision manager can proceed to apply the non-transformable operation. After all clients of the collaboration are in sync, then revision manager module 310 applies the non-transformable record and updates all the clients accordingly.

Figure 6:
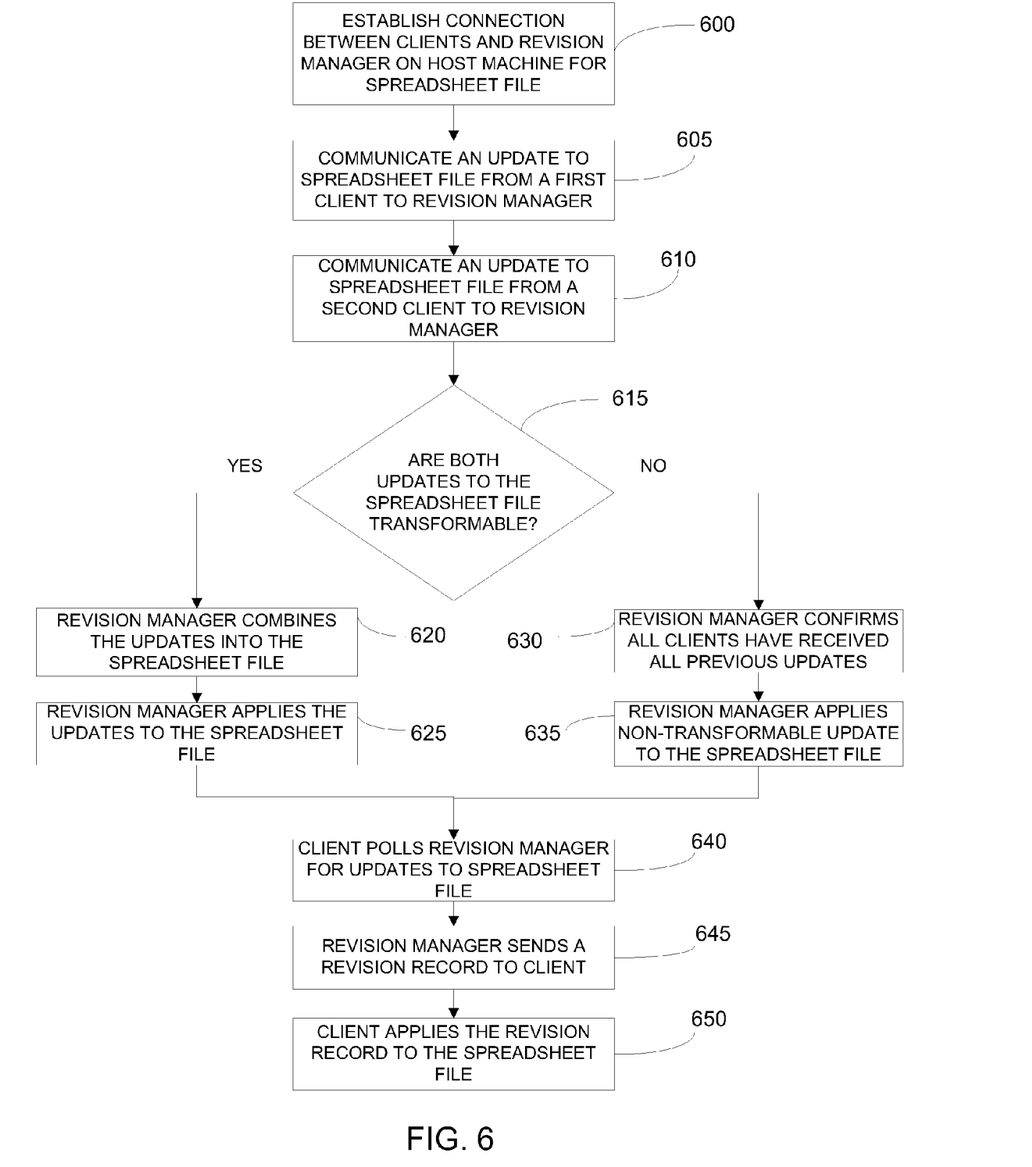

In order to better understand the process that takes place, the steps undertaken are set out in the flow diagram of FIG. 6. As seen therein, revision manager module 310 essentially controls the lock on spreadsheet file 230 and therefore operates to establish connection between the clients and the host machine 240 (represented by box 600). While changes or updates to spreadsheet file 230 may be communicated by any number of clients to the host machine 240, it will be seen that first and second clients send updates to the revision manager module 310 are reflected (boxes 605 and 610, respectively). When revision manager module 310 receives the updates from the first and second clients, it determines whether both updates to spreadsheet file 230 are transformable (decision box 615).

If both updates are considered to be transformable (i.e., the revision records thereof are recognized as able to be merged), then revision manager module 310 combines the updates into the spreadsheet file (box 620) and then applied such updates to the spreadsheet file 230 (box 625). If both updates are not considered to be transformable, then revision manager module 310 first confirms that all clients have received all previous updates to the spreadsheet file 230 (box 630) and then applies the non-transformable update to the spreadsheet file 230 (box 635).

In either case, it will be understood that each client preferably must poll revision manager module 310 for updates to the spreadsheet file 230 (box 640), whereupon revision manager module 310 will provide all updates to spreadsheet file 230 not previously received by the polling client computer (box 645). The client then applies the revision record supplied by revision manager module 310 (box 650) so that a current version of spreadsheet file 230 is displayed.

As should be appreciated, the clients may include additional client-side merge logic to apply records received from the revision manager/server. Without this additional client-side merge logic, a rich client may be required to block during the entire polling and update process to prevent the user from initiating any changes until the latest updates have been applied. Rich clients may include a version of the revision manager merge engine to be responsive. It should also be appreciated that real-time synchronization may not be a requirement for a fully-transformable solution. While continuous synchronization may provide a better user experience, part of the value of a fully transformable solution is that it can be temporarily taken offline to provide better remote usability and provide robustness against network problems. Furthermore, it should be appreciated that, in the event of a conflict, the revision manager may send back to clients, in addition to the revision records that the client has not yet seen, those revision records transformed to account for the conflicts between those same revision records and the new revision records that the client is currently sending up.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer-readable medium having stored thereon computer-executable instructions for performing a process comprising:
   receiving an update to one of a first feature and operation of a spreadsheet file from a first spreadsheet client;
   receiving an update to one of a second feature and operation of the spreadsheet file from a second spreadsheet client;
   determining whether or not a module is capable of merging the updates such that both updates are combinable and applicable to the spreadsheet file;
   if the module is capable of merging the updates, then combining the updates and applying them to the spreadsheet file and computing reciprocal updates to send back to the first and second spreadsheet clients;
   if the module is not capable of merging the updates, then processing the updates according to a policy for non-transformable changes, wherein the policy includes:
   confirming that all spreadsheet clients have received all previous changes; and
   applying the non-transformable changes to the spreadsheet file.

2. The computer-readable medium of claim 1, wherein the first and second spreadsheet clients are both rich clients.

3. The computer-readable medium of claim 1, wherein the first spreadsheet client is a rich client and the second spreadsheet client is a browser client.

4. The computer-readable medium of claim 1, wherein the process is performed in a real-time collaborative environment.

5. The computer-readable medium of claim 1, wherein the updates are received near simultaneously.

6. The computer-readable medium of claim 1, the process further comprising:
   receiving a request for updates to the spreadsheet file from a spreadsheet client; and,
   sending a revision record including all updates not previously received for the spreadsheet file by the spreadsheet client.

7. A method for spreadsheet collaboration, comprising the following steps:
   receiving a change to one of a first feature or operation of a spreadsheet file from a first spreadsheet client;
   receiving a change to one of a second feature or operation of the spreadsheet file from a second spreadsheet client;
   determining by one or more computer processors whether or not a module is capable of merging the changes such that both changes are combinable and applicable to the spreadsheet file;
   if the module is capable of merging the changes then combining by the one or more computer processors the changes and applying them to the spreadsheet file and computing reciprocal updates to send back to the first and second spreadsheet clients;
   if the module is not capable of merging the changes, then processing by the one or more computer processors the changes according to a policy for non-transformable changes, wherein the policy includes:
   confirming that all spreadsheet clients have received all previous changes; and
   applying the non-transformable changes to the spreadsheet file.

8. The method of claim 7, wherein the first and second spreadsheet clients are both rich clients.

9. The method of claim 7, wherein the first spreadsheet client is a rich client and the second spreadsheet client is a browser client.

10. The method of claim 7, wherein the method is performed in a real-time collaborative environment.

11. The method of claim 7, wherein the changes are received near simultaneously.

12. The method of claim 7, further comprising the following steps:
   receiving a request for updates to the spreadsheet file from a spreadsheet client; and,
   sending a revision record including all updates not previously received for the spreadsheet file by the spreadsheet client.

13. A system for spreadsheet collaboration, comprising:
   a processor operative to execute computer-executable instructions; and
   memory having stored therein computer-executable instructions for performing a process comprising:
   receiving a change to one of a first feature or operation of a spreadsheet file from a first spreadsheet client;
   receiving a change to one of a second feature or operation of the spreadsheet file from a second spreadsheet client;
   determining whether or not a module is capable of merging the changes such that both changes are combinable and applicable to the spreadsheet file;

if the module is capable of merging the changes, then combining the changes and applying them to the spreadsheet file;

if the module is not capable of merging the changes, then processing the changes according to a policy for non-transformable changes, wherein the policy includes:

confirming that all spreadsheet clients have received all previous changes; and applying the non-transformable changes to the spreadsheet file.

14. The system of claim 13, wherein the process is performed by a revision manager.

15. The system of claim 13, wherein the first client is a rich client and the second client is a browser client.

16. The system of claim 13, wherein the process is performed in a real-time collaborative environment.

17. The system of claim 13, wherein the changes are received at the same time.

* * * * *